(12) United States Patent
Caro et al.

(10) Patent No.: US 8,075,651 B2
(45) Date of Patent: Dec. 13, 2011

(54) ELLIPSOID EXHAUST INTAKE BONNET (EIB) FOR MARITIME EMISSIONS CONTROL SYSTEM

(76) Inventors: Sal Caro, Camarillo, CA (US); Kevin Connolly, Ventura, CA (US); Jason McAuley, Port Hueneme, CA (US)

( * ) Notice: Subject to any disclaimer, the term of this patent is extended or adjusted under 35 U.S.C. 154(b) by 205 days.

(21) Appl. No.: 12/356,862

(22) Filed: Jan. 21, 2009

(65) Prior Publication Data
US 2010/0180559 A1 Jul. 22, 2010

(51) Int. Cl.
*A01F 25/00* (2006.01)
*A01F 25/10* (2006.01)

(52) U.S. Cl. ....... 55/385.1; 110/121; 110/125; 110/216; 110/217; 114/187; 440/89 A; 440/89 R; 440/113

(58) Field of Classification Search ............. 55/385.1, 55/356, DIG. 18, DIG. 46; 95/273; 110/121, 110/125, 216, 217; 414/137.4, 291, 292; 114/187; 366/22, 25, 40; 440/89 A, 89 R, 440/113; 141/97; 193/25 B; 198/560
See application file for complete search history.

(56) References Cited

U.S. PATENT DOCUMENTS

| | | | |
|---|---|---|---|
| 1,013,358 A | 1/1912 | Andrews | |
| 1,439,226 A | 12/1922 | Clarke | |
| 4,099,452 A | 7/1978 | Costen | |
| 4,248,277 A * | 2/1981 | Hanrot et al. | 141/93 |
| 4,340,136 A * | 7/1982 | Hanrot et al. | 193/15 |
| 4,442,766 A | 4/1984 | Hawkins | |
| 4,637,300 A | 1/1987 | Cole | |
| 4,652,199 A * | 3/1987 | Pole | 414/291 |
| 4,756,359 A | 7/1988 | Greer | |
| 4,854,801 A * | 8/1989 | Bonerb | 414/291 |
| 4,912,928 A | 4/1990 | Kaneko | |
| 4,990,045 A * | 2/1991 | Aralt | 414/137.4 |
| 5,092,226 A | 3/1992 | McCloskey | |
| 5,281,246 A | 1/1994 | Ray et al. | |
| 5,427,491 A * | 6/1995 | Duffy et al. | 414/291 |
| 5,460,301 A | 10/1995 | Ebinger et al. | |
| 5,603,215 A | 2/1997 | Sung et al. | |
| 5,613,990 A | 3/1997 | Diachuk | |
| 5,622,538 A | 4/1997 | Diachuk | |
| 5,636,959 A * | 6/1997 | Kroell et al. | 414/137.4 |
| 5,687,773 A | 11/1997 | Ryan et al. | |
| 5,823,218 A | 10/1998 | Schlecht et al. | |
| 5,827,490 A | 10/1998 | Jones | |
| 5,842,918 A | 12/1998 | Cowen | |
| 5,980,343 A | 11/1999 | Rollinski | |
| 6,022,389 A | 2/2000 | Vross et al. | |
| 6,176,082 B1 | 1/2001 | Shaffer | |
| 6,244,918 B1 | 6/2001 | Cameron | |
| 6,332,308 B1 | 12/2001 | Miller | |

(Continued)

*Primary Examiner* — Duane Smith
*Assistant Examiner* — Minh-Chau Pham
(74) *Attorney, Agent, or Firm* — Kenneth L. Green

(57) ABSTRACT

An improved Exhaust Intake Bonnet (EIB) for an Advanced Maritime Emissions Control System (AMECS) includes a ribbed frame lowered and then drawn around a stack of an Ocean Going Vessel (OGV), and a shroud unfurled over the ribbed frame. The ribbed frame has a more flexible structure to better conform to rectangular and oval stacks. The bonnet includes a peak with a duct for receiving exhaust gasses captured by the shroud. The bonnet is positioned over the stack using a deployment arm. A duct carries exhaust from the stack to an Advanced Maritime Emissions Control Unit (AMECU) where the exhaust gasses are processed before releasing to the air. The AMECU) may reside on a ship, a barge, a trailer next to a docked OGV, or be a stationary AMECU) on a dock.

10 Claims, 6 Drawing Sheets

U.S. PATENT DOCUMENTS

| | | |
|---|---|---|
| 6,442,933 B2 | 9/2002 | Rusch |
| 6,463,958 B1 | 10/2002 | Schwing |
| 6,647,711 B1 | 11/2003 | Spiegel et al. |
| 6,660,239 B2 | 12/2003 | Nagii |
| 6,667,011 B1 | 12/2003 | Munje et al. |
| 6,726,736 B2 | 4/2004 | Kociejda et al. |
| 6,761,868 B2 | 7/2004 | Brooks et al. |
| 6,910,930 B1 | 6/2005 | Mitchell |
| 7,258,710 B2 * | 8/2007 | Caro et al. ............. 55/385.1 |
| 7,275,366 B2 | 10/2007 | Powell et al. |
| 2004/0144080 A1 | 7/2004 | Suzuki et al. |
| 2004/0163377 A1 | 8/2004 | Liu |

* cited by examiner

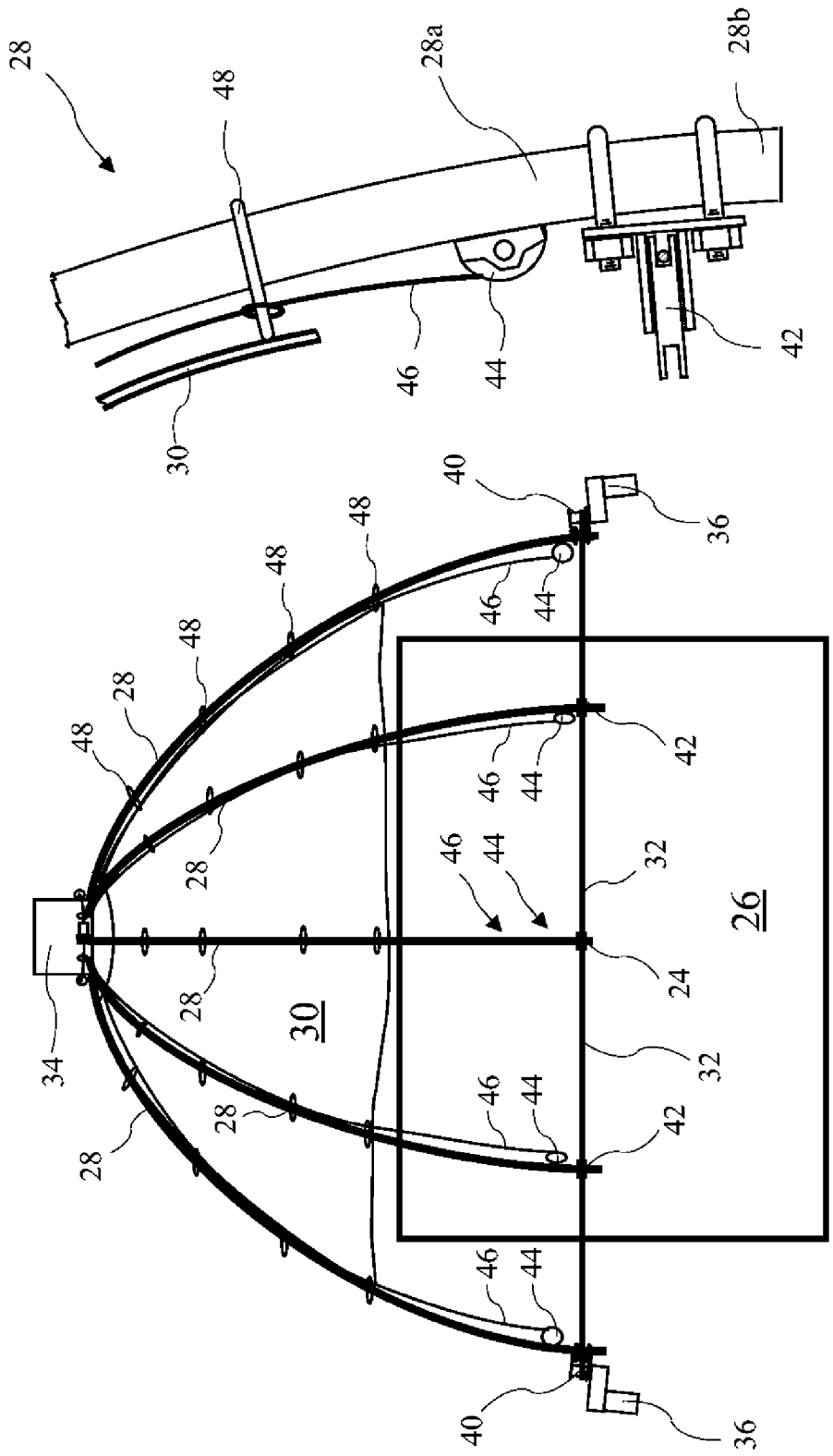

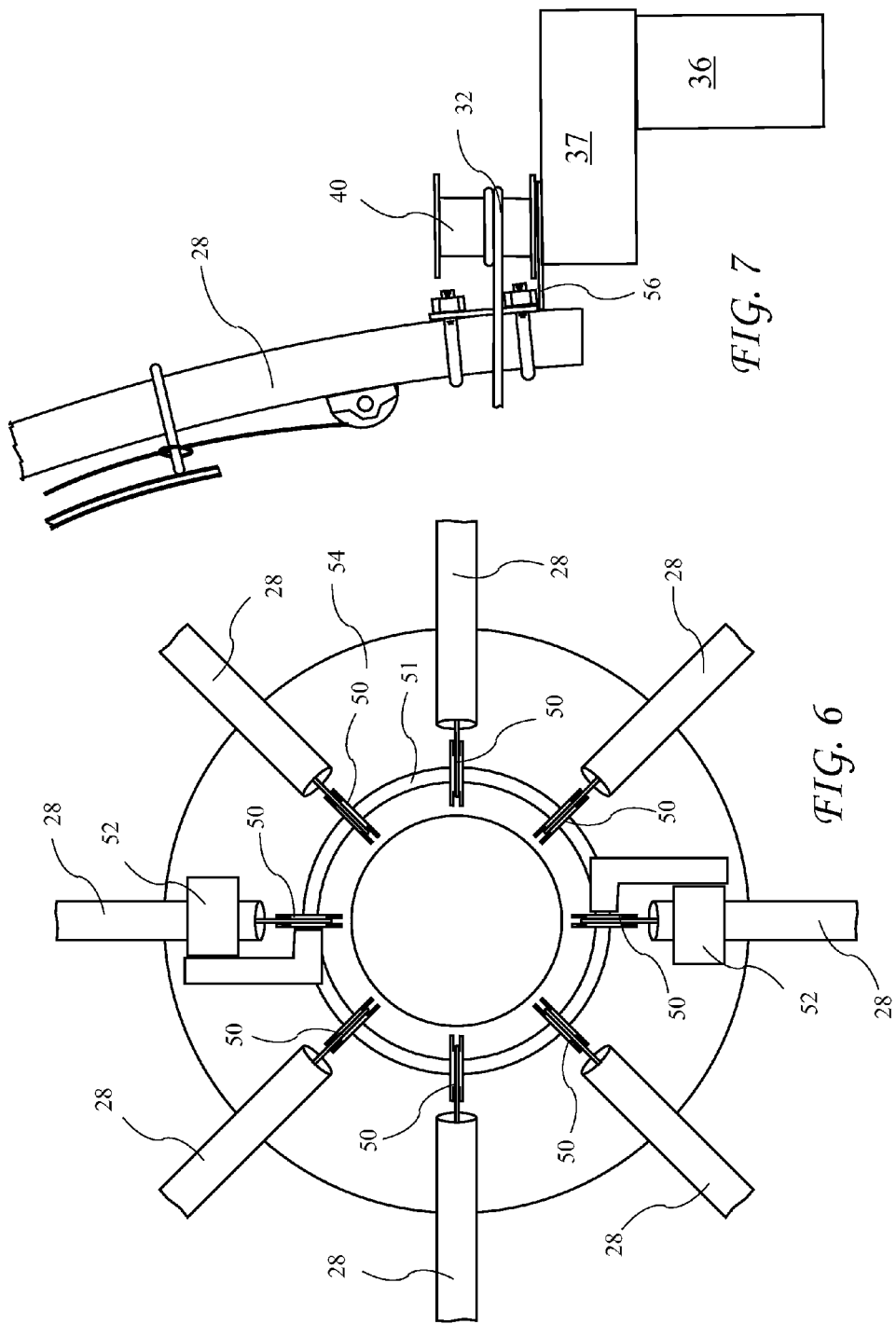

ELLIPSOID EXHAUST INTAKE BONNET (EIB) FOR MARITIME EMISSIONS CONTROL SYSTEM

BACKGROUND OF THE INVENTION

The present invention relates to the reduction of emissions from Ocean Going Vessels (OGVs), and more particularly to an improved Exhaust Intake Bonnet (EIB) for capturing and processing emissions from OGVs.

A substantial quantity of pollutants are produced by burning fuel in OGVs. The pollutants produced when an engine burns bunker and/or diesel fuel is a complex mixture of thousands of gases and fine particles, commonly known as soot, which contains more than forty toxic air contaminates. These contaminates include arsenic, benzene, and formaldehyde along with other ozone-forming pollutants that are components of smog and acid rain, such as carbon dioxide ($CO_2$), sulphur dioxide ($SO_2$), and nitrogen oxides ($NO_X$). An OGV may create and exhaust as much $NO_X$ as 12,500 automobiles or as an oil refinery, and thus is a substantial health risk to port workers and residents of surrounding communities, and may physically damage structures and equipment.

U.S. Pat. No. 7,258,710 for "Maritime Emissions Control System," assigned to the assignee of the present invention, describes a mobile emissions control system which may be transported to a ship within a harbor, and which mobile emissions control system captures and processes a main exhaust flow from the ship to reduce emissions. The main exhaust flow may be from the ship's engine(s), auxiliary generators, or any other source of exhaust from the ship. The emissions control system of the '710 patent includes a bonnet which is lowered over the ship's stack. Although the bonnet described in the '710 patent is adequate in most cases, in some situation, for example rectangular stacks, the bonnet of the '710 patent may not provide a close fit to sides of the stack.

BRIEF SUMMARY OF THE INVENTION

The present invention addresses the above and other needs by providing an improved Exhaust Intake Bonnet (EIB) for an Advanced Maritime Emissions Control System (AMECS) which includes a ribbed frame lowered and then drawn around a stack of an Ocean Going Vessel (OGV), and a shroud unfurled over the ribbed frame. The ribbed frame has a more flexible structure to better conform to rectangular and oval stacks. The bonnet includes a peak with a duct for receiving exhaust gasses captured by the shroud. The bonnet is positioned over the stack using a deployment arm. A duct carries exhaust from the stack to an Advanced Maritime Emissions Control Unit (AMECU) where the exhaust gasses are processed before releasing to the air. The AMECU may reside on a ship, a barge, a trailer next to a docked OGV, or be a stationary AMECU on a dock.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 4 shows a detailed view of the improved EIB over the stack.

FIG. 5 shows a more detailed view of a lower end of a rib of the cage.

FIG. 6 shows a detailed top view of the EIB according to the present invention.

FIG. 7 shows a detailed view of a cinching motor and hub of the EIB according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
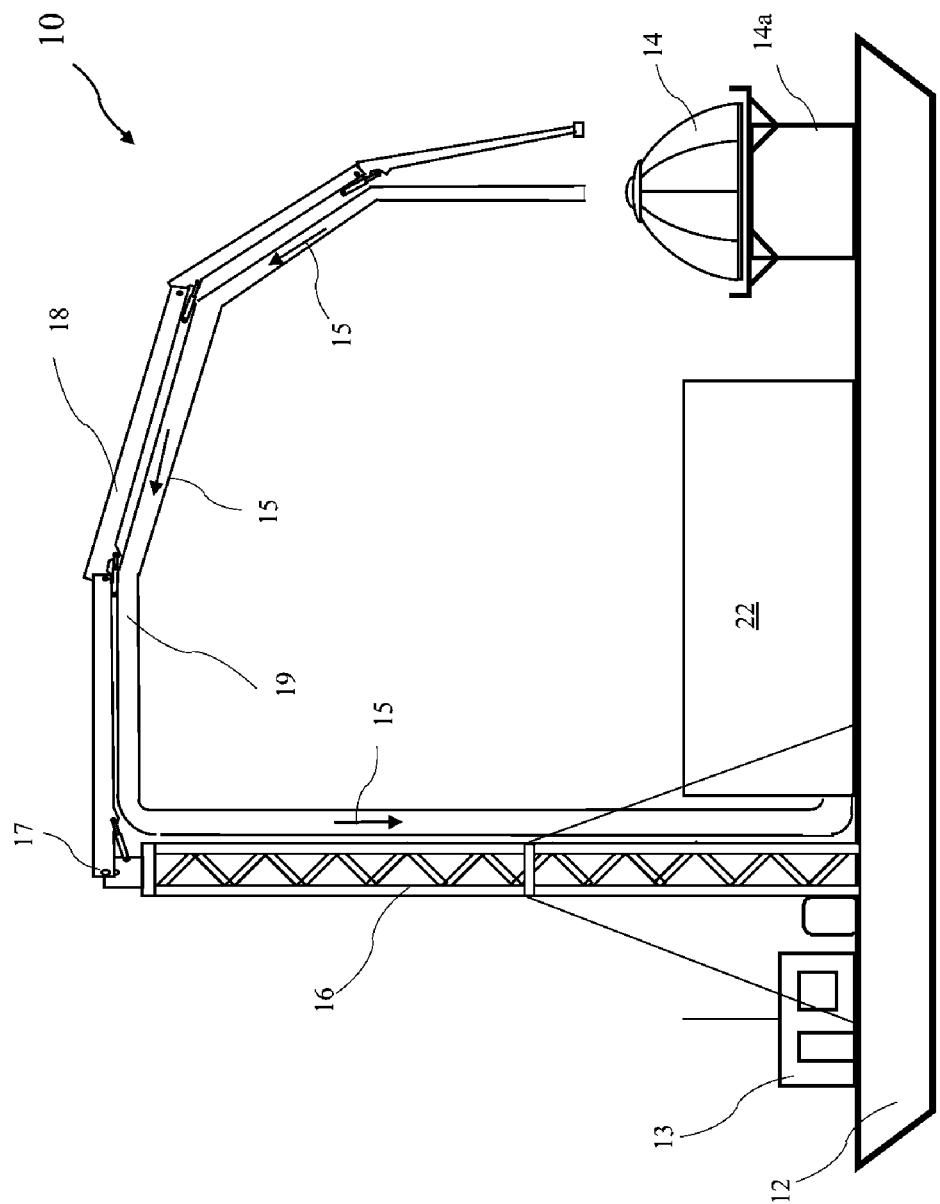
FIG. 1 is an Advanced Maritime Emissions Control System (AMECS) with an improved Exhaust Intake Bonnet (EIB) according to the present invention.

An Advanced Maritime Emissions Control System (AMECS) 10 including an improved Exhaust Intake Bonnet (EIB) 14 according to the present invention is shown generally in FIG. 1. The AMECS 10 comprises the EIB 14, a tower 16, and an articulating arm 18, a duct 19 carried by the tower 16 and arm 18, and an Advanced Maritime Emissions Control Unit (AMECU) 22. The AMECS 10 is configured to capture exhaust 15 from a stack 26 of an Ocean Going Vessel (OGV) 24. The position of an Unpowered Seagoing Barge (USB) 12 relative to the OGV 24 is stabilized by a stabilization arm 11 connected between the tower 16 and the OGV 24. The AMECS 10 may be mounted on the USB 12 as shown, a ship, a trailer next to a docked OGV, or be a stationary ECS on a dock next to a docked OGV.

An AMECS is described in detail in U.S. Pat. No. 7,258,710 for "Maritime Emissions Control System," assigned to the assignee of the present invention, details of an improved emissions control unit are described in U.S. Pat. No. 7,275,366 for "High Thermal Efficiency Selective Catalytic Reduction (SCR) System," also assigned to the assignee of the present invention, and a further improved emissions control unit are described in U.S. patent application Ser. No. 11/092,477 for "Air Pollution Control System for Ocean-going Vessels," also assigned to the assignee of the present invention. The '710 and '366 patents and the '477 patent application are herein incorporated by reference.

Figure 2A:
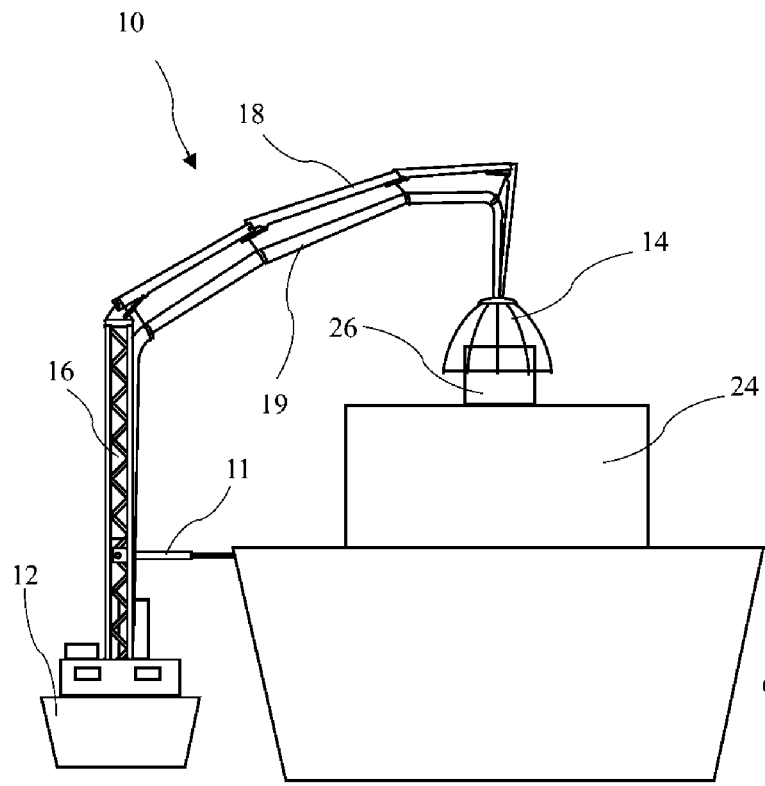
FIG. 2A depicts an AMECS deploying the improved EIB over a stack of an Ocean Going Vessel (OGV).
Figure 2B:
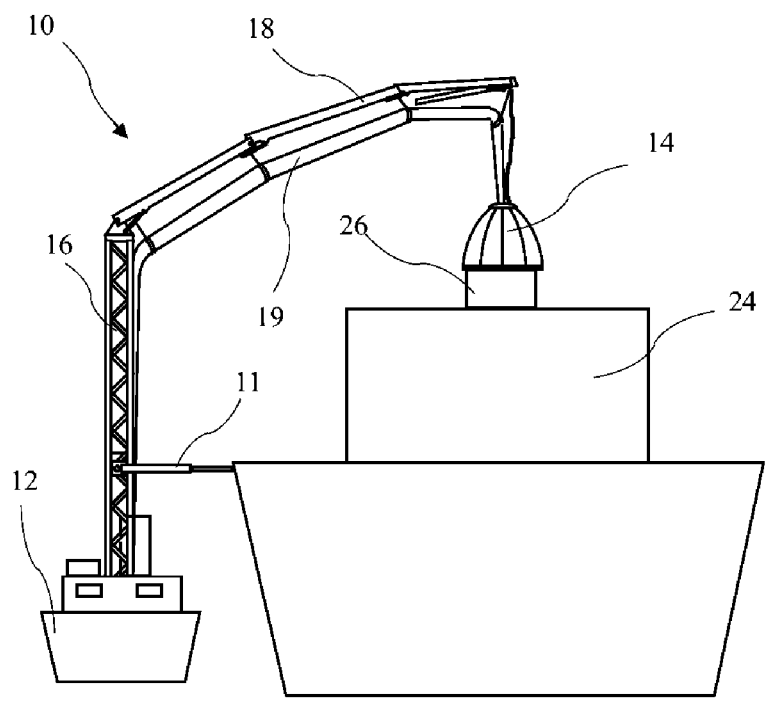
FIG. 2B shows the improved EIB over the stack with an end segment of an articulating arm retracted from the bonnet.
Figure 3A:
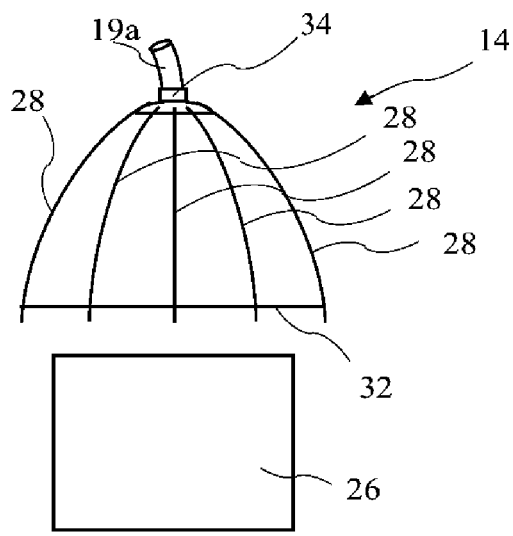
FIG. 3A shows the improved EIB positioned above the stack.
Figure 3B:
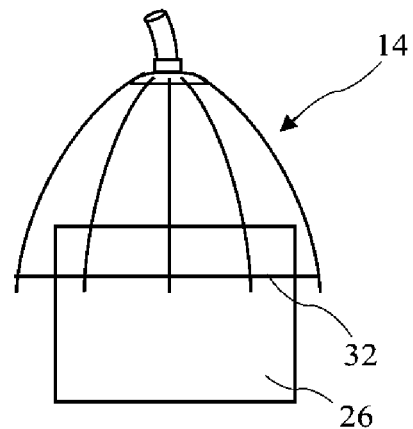
FIG. 3B shows a cage of the improved EIB positioned on the stack.
Figure 3C:
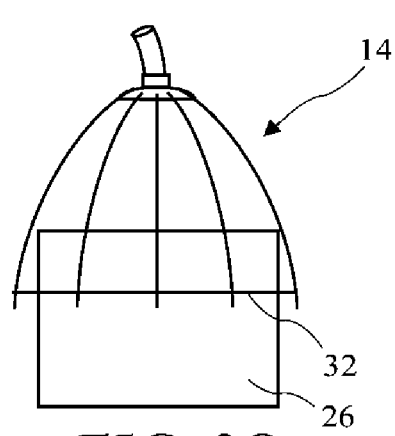
FIG. 3C shows a lower edge of the cage drawn around the stack.
Figure 3D:
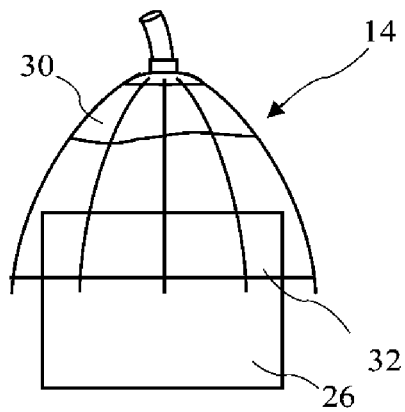
FIG. 3D shows a shroud partially unfurled over the cage.
Figure 3E:
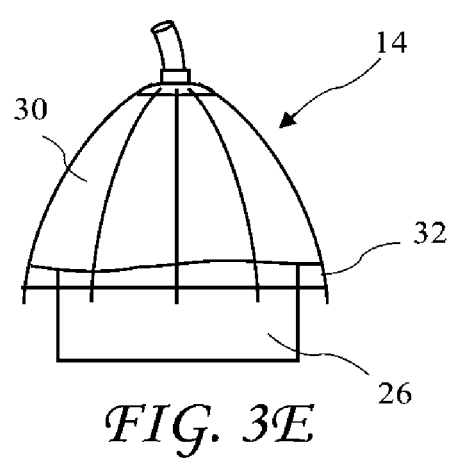
FIG. 3E shows the shroud fully unfurled over the cage.

The AMECS 10 and the OGV 24 with the improved EIB 14 positioned above a stack 26 of the OGV 24 with a shroud 30 furled to provide a minimum profile to wind is shown in FIG. 2A, and with the shroud 30 unfurled (or expanded) over the stack 26 of the OGV 24 is shown in FIG. 2B.

An example of a set of steps of attachment of the EIB 14 to the stack 26 are shown in FIGS. 3A through 3E. The EIB 14 including ribs 28 forming a cage-like structure (or frame), a top portion 34 for connecting to the duct 19 resides above ribs 28, and a cinching line 32 resides near the bottom of the ribs 28, is shown above the stack 26 in FIG. 3A. The EIB 14 is shown lowered over the stack 26 in FIG. 3B. The downward end of the EIB 14 is drawn to close around the stack 26 by the cinching line 32 in FIG. 3C. The shroud 30 is partially unfurled between the stack 26 and the ribs 28 in FIG. 3D. The shroud 30 is fully unfurled between the stack 26 and the ribs 28 in FIG. 3E. The EIB 14 preferably includes eight to twenty four ribs 28, and more preferably sixteen ribs 28. While the cinching line 32 is shown proximal to the bottom of the ribs, the cinching line 32 may alternatively reside approximately vertically centered on the ribs 28.

A detailed view of the EIB 14 is shown in FIG. 4. The ribs 28 are attached to the top portion 34 and are outwardly center arced, that is, the center of each rib 28 is bowed outwards. At least one cinching motor 36 and one cinching hub 40 connected to the motor 36 are connected to one of the ribs 28 proximal to the bottom of the rib. The end of the cinching line 32 wraps around the hub 40, and through pulleys 42 attached to the other ribs 28 and back to the rib 28 which the motor and hub are attached to. The motor 36 is preferably a constant-torque motor that when activated, tightens a cinching line 32 thereby compressing the ribs 28 and providing constant pressure for a friction-seal. The ribs 28 may thus be closed (or compressed) around the stack 26 by winding the end of the cinching line 32 around the hub 40. The EIB 14 may have a single cinching motor and cinching hub, two cinching motors and cinching hubs attached to opposite ribs 28, or more than two cinching motors and cinching hubs, however, two cinching motors and cinching hubs attached to opposite ribs 28 are a preferred configuration. The cinching line may engage every pulley 42, every second pulley 42, or every third pulley 42 to obtain a desired geometry. Two preferred geometries are described in FIGS. 8A, 8B, 9A, and 9B. Details of the cinching motor 36 and hub 40 are shown in FIG. 7 below.

The shroud 30 is connected to the ribs 28 by rings 48 which are attached to the shroud 30 and slide on the ribs 28 as shown partially in FIG. 5. The shroud 30 is raised and lowered by shroud lines 46 which run through the ribs 28 between top pulleys 50 (see FIG. 6) and bottom pulleys 44 near the bottoms 28b of the ribs 28 and back between the shroud 20 and the ribs 28 forming a continuous loop. The lower-most of the rings 48 on each rib 28 are attached to the shroud lines 46 to raise and lower the shroud.

A top plate 54 of the bonnet 14 is shown in FIG. 6. The top ends of the ribs 28 are preferably fixed to the top plate 54, and the ribs 28 flex when the cinching line 32 is tightened. Alternatively, the top ends of the ribs 28 could be pivotally attached to the top piece 54 with springs biasing the ribs 28 outward. The top pulleys 50 are attached to the top piece and inboard and aligned with top ends of the ribs 28 to feed the shroud lines through the ribs 28. At least one shroud motor 52 is connected to at least one of the pulleys 50 to rotate the pulley to raise and lower the shroud 30. Preferably, the pulleys 50 are rotationally connected by a flexible shaft 51, and turning one of the pulleys 50 causes at least one other pulley 50 to also turn. Preferably, the shroud motor 52 comprises two shroud motors 52 driving all of the top pulleys 50 for raising and lowering the shroud 30.

A detailed view of the cinching motor 36 and hub 40 are shown in FIG. 7. The motor 36 turns the hub 40 through a gearbox 37. The end of the cinching line 32 is attached to the hub 40 to allow the motor 36 to cinch the ribs 28.

Figure 8A:
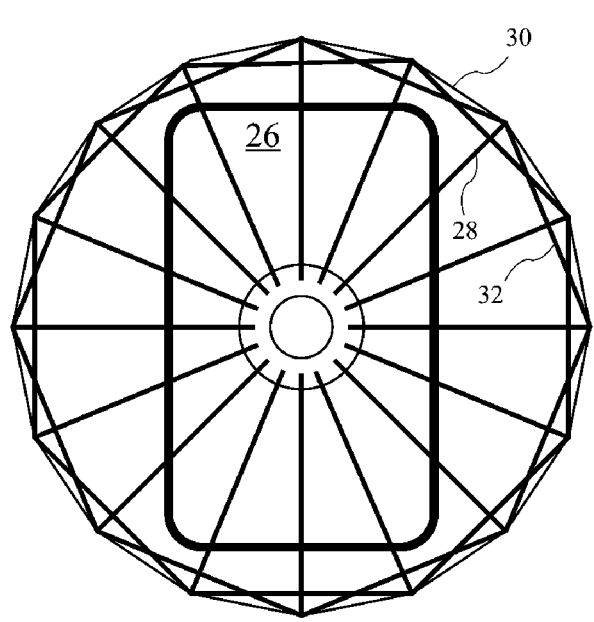
FIG. 8A shows an embodiment of the EIB according to the present invention with a cinching line skipping every second rib.
Figure 8B:
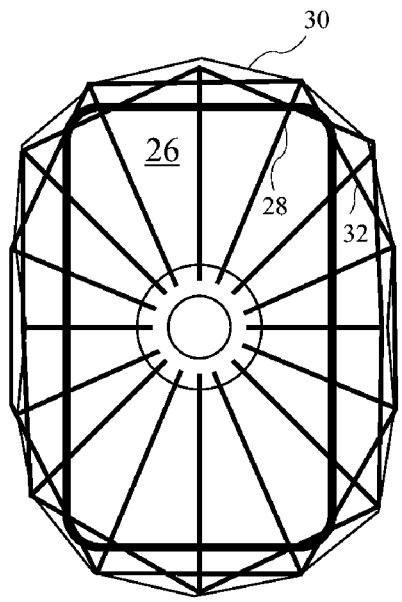
FIG. 8b shows an embodiment of the EIB according to the present invention with a cinching line skipping every second rib with the ribs cinched on a stack.

A top view of an embodiment of the EIB 14 according to the present invention having 16 ribs 28 and a cinching line 32 skipping every second rib 28 is shown in FIG. 8A with the ribs 28 open and in FIG. 8B with the ribs 28 closed on the stack 26. For some stack shapes, skipping every second rib 28 provides a closer fit to the stack 26 when the ribs 28 are cinched.

Figure 9A:
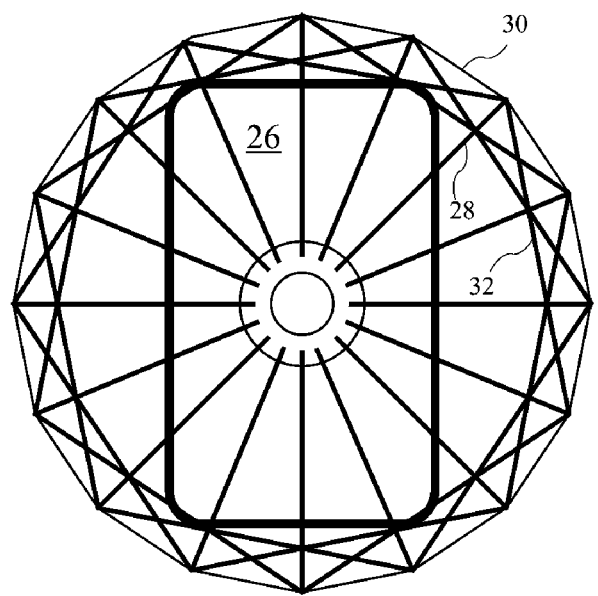
FIG. 9A shows an embodiment of the EIB according to the present invention with a cinching line skipping every second and third rib.
Figure 9B:
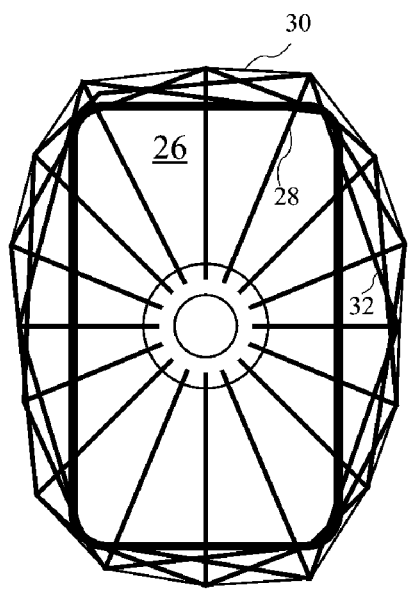
FIG. 9b shows an embodiment of the EIB according to the present invention with a cinching line skipping every second and third rib with the ribs cinched on a stack.

A top view of an embodiment of the EIB 14 according to the present invention having sixteen ribs 28 and a cinching line 32 skipping every second and third rib 28 is shown in FIG. 9A with the ribs 28 open and in FIG. 9B with the ribs 28 closed on the stack 26. For some stack shapes, skipping every second and third rib 28 provides a closer fit to the stack 26 when the ribs 28 are cinched.

While various lines are described above, other similar means may be used to connect elements of the present invention, and an otherwise similar device using lines comprising wire rope, cables, cords, wires, and the like, is intended to come within the scope of the present invention.

While the invention herein disclosed has been described by means of specific embodiments and applications thereof, numerous modifications and variations could be made thereto by those skilled in the art without departing from the scope of the invention set forth in the claims.

We claim:

1. An Exhaust Intake Bonnet (EIB) for an Advanced Maritime Emissions Control System (AMECS), the EIB comprising:
    a top piece;
    a duct connector horizontally centered on the top piece connectable to a duct for carrying exhaust gasses from an Ocean Going Vessel (OGV) to an Advanced Maritime Emissions Control Unit (AMECU) for processing;
    outwardly and downwardly extending outwardly center arced ribs attached to the top piece normally residing in an open position allowing the EIB to be lowered over a stack of the OGV and biasable to a closed position closer to the stack;
    at least one cinching line reaching around bottoms of the ribs and connecting the bottoms of the ribs for cinching the bottoms of the ribs to pull the bottoms of the ribs closer to the stack; and
    a shroud lowerable and raiseable inside the ribs, the raising and lowering of the shroud independent of cinching the bottoms of the ribs.

2. The EIB of claim 1, wherein the shroud is slidably connected to the ribs by rings which slide on the ribs.

3. The EIB of claim 2, wherein shroud lines run in a continuous loop between the top piece and bottom ends of the ribs and a bottom edge of the shroud is attached to the shroud lines for lowering and raising the shroud.

4. The EIB of claim 3, wherein:
    the shroud lines run between top pulleys and bottom pulleys; and
    shroud motors are attached to the top piece for rotating the top pulleys for lowering and raising the shroud.

5. The EIB of claim 1, wherein the cinching line is consecutively attached to skip every second rib to allow the closed EIB to fit certain stack shapes better.

6. The EIB of claim 1, wherein the cinching line is consecutively attached to skip every second and third rib to allow the closed EIB to fit certain stack shapes better.

7. The EIB of claim 1, wherein at least one cinching motor is attached to one of the ribs and turns a hub to shorten the cinching line to close the EIB around the stack.

8. The EIB of claim 1, wherein the shroud resides inside a cage formed by the ribs.

9. An Exhaust Intake Bonnet (EIB) for an Advanced Maritime Emissions Control System (AMECS), the EIB comprising:
   a top piece;
   a duct connector horizontally centered on the top piece connectable to a duct for carrying exhaust gasses from an Ocean Going Vessel (OGV) to an Advanced Maritime Emissions Control Unit (AMECU) for processing;
   outwardly and downwardly extending outwardly center arced ribs attached to the top piece and forming a cage, the ribs normally residing in an open position allowing the EIB to be lowered over a stack of the OGV and biasable to a closed position closer to the stack;
   first and second cinching lines reaching around bottoms of the ribs and connecting the bottoms of the ribs for cinching the bottoms of the ribs to pull the bottoms of the ribs closer to the stack;
   the first cinching line connecting with even ribs and not connecting with odd ribs between the even ribs and cinching only the even ribs;
   the second cinching line connecting with the odd ribs and not connecting with the even ribs between the odd ribs and cinching only the odd ribs; and
   a shroud lowerable and raiseable inside the cage, the raising and lowering of the shroud independent of cinching the bottoms of the ribs.

10. An Exhaust Intake Bonnet (EIB) for an Advanced Maritime Emissions Control System (AMECS), the EIB comprising:
   a top piece;
   a duct connector horizontally centered on the top piece connectable to a duct for carrying exhaust gasses from an Ocean Going Vessel (OGV) to an Advanced Maritime Emissions Control Unit (AMECU) for processing;
   outwardly and downwardly extending outwardly center arced ribs attached to the top piece and forming a cage, the ribs normally residing in an open position allowing the EIB to be lowered over a stack of the OGV and biasable to a closed position closer to the stack;
   first, second, and third cinching lines reaching around bottoms of the ribs and connecting the bottoms of the ribs for cinching the bottoms of the ribs to pull the bottoms of the ribs closer to the stack;
   the first cinching line connecting with a first, fourth, seventh, and remaining third ribs and not connecting with ribs between the first, fourth, seventh, and remaining third ribs and cinching only the first, fourth, seventh, and remaining third ribs;
   the second cinching line connecting with a second, fifth, eighth, and remaining third ribs and not connecting with ribs between the first, second, fifth, eighth, and remaining third ribs and cinching only the second, fifth, eighth, and remaining third ribs;
   the third cinching line connecting with a third, sixth, ninth, and remaining third ribs and not connecting with ribs between the third, sixth, ninth, and remaining third ribs and cinching only the third, sixth, ninth, and remaining third ribs; and
   a shroud lowerable and raiseable inside the cage, the raising and lowering of the shroud independent of cinching the bottoms of the ribs.

* * * * *